(No Model.)
J. B. JOHNSON.
PLANT TRAY.
No. 366,776. Patented July 19, 1887.
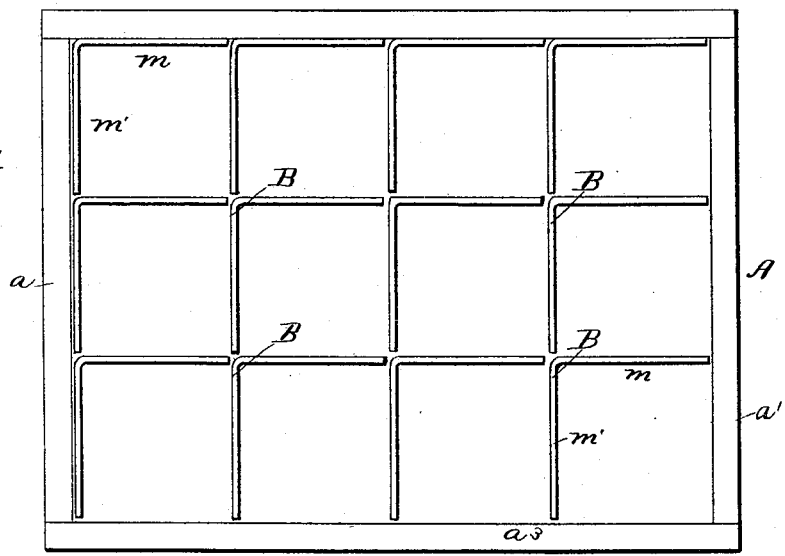
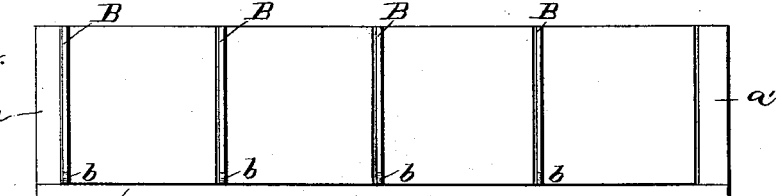
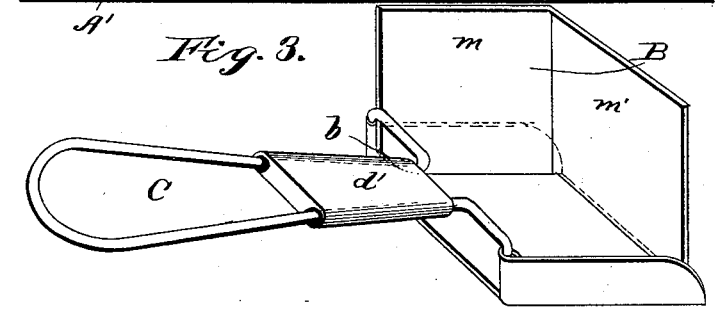
Witnesses
R. B. Caurie
Mortimer Redman
Inventor
John B. Johnson
By his Attorneys
R. S. & A. P. Lacey

UNITED STATES PATENT OFFICE.

JOHN B. JOHNSON, OF NEWTON, ILLINOIS.

PLANT-TRAY.

SPECIFICATION forming part of Letters Patent No. 366,776, dated July 19, 1887.

Application filed December 7, 1886. Serial No. 220,874. (No model.)

*To all whom it may concern:*

Be it known that I, JOHN B. JOHNSON, a citizen of the United States, residing at Newton, in the county of Jasper and State of Illinois, have invented certain new and useful Improvements in Plant-Trays or Propagating-Boxes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to plant-trays or propagating-boxes, and has for its object to prevent the lateral and downward growth of the roots, so that there will be no necessity for root-pruning or crushing of the leaves of the plants in transplanting, and to devise a construction by which the plants will be kept separate and the work of transplanting facilitated and rendered comparatively much less laborious.

The improvement consists in the novel features hereinafter more fully described and claimed, and shown in the annexed drawings, in which—

Figure 1 is a plan view of the bed embodying my improvements; Fig. 2, a side view, having the nearer side of the tray removed; and Fig. 3, a perspective detail view showing the application of the lifter.

My improved device consists of a tray divided into a series of compartments by right-angled partitions.

The tray A is of ordinary shape, comprising the bottom A' and sides $a$, $a'$, $a^2$, and $a^3$, set at right angles to the bottom. The tray may be of any desired depth and size, according to the nature of the plant. It is divided into a series of compartments by the right-angled partitions or plates B bent midway of their ends, forming wings $m$ and $m'$, which are extended at right angles to each other, and which are so disposed that the sides of the tray form sides for the outer compartment, and the bottom of the tray forms a common bottom for all of the compartments, and the sides or wings of one partition or plate of one compartment form sides for adjacent compartments. The partitions or plates can be made of any suitable material, veneer and sheet metal being preferable, and one of the lower corners, $b$, of the side or wing of each is cut away, so that a lifter can be readily inserted between it and the bottom of the tray when it is desired to remove the contents and the partition or plate of one compartment.

The lifter must be sufficiently wide, so that the sides thereof will embrace the sides of the compartment. The partitions or plates, having only two sides or wings, can be stored in a small space, and can be used a number of times.

In practice a tray is divided into compartments by the partitions, forming a number of plant-holding receptacles, which are filled with earth or compost. Seeds are planted and plants are grown therein till ready for transplanting. Then the tray and contents are taken to the garden or field and one side is knocked off. This leaves the plant-holders exposed and ready for the operation of transplanting. Push the lifter under one of the plant-holders, lift it out, place it in a hole prepared for it, withdraw the lifter, draw the earth round loosely, lift out the partition, and the operation is complete.

Having thus described my invention, what I claim, and desire to secure by Letters Patent, is—

1. The combination, with the tray composed of bottom and sides, of the series of independent plates bent midway of their ends, forming two wings only at right angles to each other and arranged substantially as shown, and having the lower edges of the wings resting on and the sides of the wings at right angles to the bottom of the tray and dividing it into a number of compartments, substantially as described, and for the purposes specified.

2. The combination, with the tray, of the right-angled partitions, dividing the same into a series of compartments, and having the lower corner of the partitions cut away, as shown, to form a space between the bottom of the tray and the lower edges of said partitions, substantially as set forth.

In testimony whereof I affix my signature in presence of two witnesses.

JOHN B. JOHNSON.

Witnesses:
JOHN Q. WEBB,
JAMES W. GIBSON.